United States Patent [19]
Fike

[11] Patent Number: 6,051,178
[45] Date of Patent: Apr. 18, 2000

[54] METHOD AND APPARATUS FOR MAKING AN ENDLESS RUBBER TRACTOR TRACK

[75] Inventor: Louis T. Fike, Hacienda Heights, Calif.

[73] Assignee: Goodyear Tire & Rubber Company, Akron, Ohio

[21] Appl. No.: 09/253,328

[22] Filed: Feb. 19, 1999

[51] Int. Cl.[7] .................................................. B29C 35/00
[52] U.S. Cl. ........................ 264/326; 156/140; 156/141; 264/271.1; 425/34.2; 425/394
[58] Field of Search ................................ 264/271.1, 315, 264/326; 425/28.1, 34.2, 31, 32, 394, 395, 403; 156/117, 124, 140, 141, 137, 133

[56] References Cited

U.S. PATENT DOCUMENTS

| | | |
|---|---|---|
| 1,579,922 | 4/1926 | Gammeter . |
| 1,665,870 | 4/1928 | Wetmore . |
| 1,715,973 | 6/1929 | Abbott . |
| 1,763,589 | 6/1930 | Kirk . |
| 1,779,376 | 10/1930 | Swern . |
| 1,779,377 | 10/1930 | Swern . |
| 1,949,443 | 3/1934 | Abbott . |
| 1,986,092 | 1/1935 | Abbott . |
| 2,747,225 | 5/1956 | Zona . |
| 3,222,716 | 12/1965 | Harris . |
| 3,791,897 | 2/1974 | Mesly . |
| 3,934,968 | 1/1976 | Cicognani . |
| 4,003,686 | 1/1977 | McCleod et al. . |
| 4,038,001 | 7/1977 | Stinnes . |
| 4,184,822 | 1/1980 | Schwabauer . |
| 4,510,113 | 4/1985 | Takano et al. . |
| 4,575,438 | 3/1986 | Fike . |
| 5,104,600 | 4/1992 | Redmond . |
| 5,204,036 | 4/1993 | MacMillan . |
| 5,207,849 | 5/1993 | Siegenthaler . |
| 5,243,532 | 9/1993 | Macchiarulo ........................... 425/34.2 |
| 5,271,727 | 12/1993 | Irie . |
| 5,346,663 | 9/1994 | Siegenthaler . |
| 5,460,771 | 10/1995 | Mitchell et al. . |
| 5,536,464 | 7/1996 | Muramatsu ............................. 425/34.2 |

FOREIGN PATENT DOCUMENTS

| | | |
|---|---|---|
| 0 419 424 A2 | 8/1990 | European Pat. Off. . |
| 2 053 786 | 7/1979 | United Kingdom . |
| WO 91/04145 | 4/1991 | WIPO . |

*Primary Examiner*—Mathieu D. Vargot
*Attorney, Agent, or Firm*—Fulwider Patton Lee & Utecht, LLP

[57] ABSTRACT

Method and apparatus for molding an endless tractor track from an uncured belt and a plurality of drive lugs wherein the drive lugs are urged into cavities formed in the inner segments of a molding press, partially final formed and pressed onto the inner periphery of the belt, the belt and lugs are positioned in the molding press to be cured and molded together while treads are formed on the outer periphery of the belt, the drive lugs are finally formed and the completed belt is cooled and removed from the molding press.

21 Claims, 17 Drawing Sheets

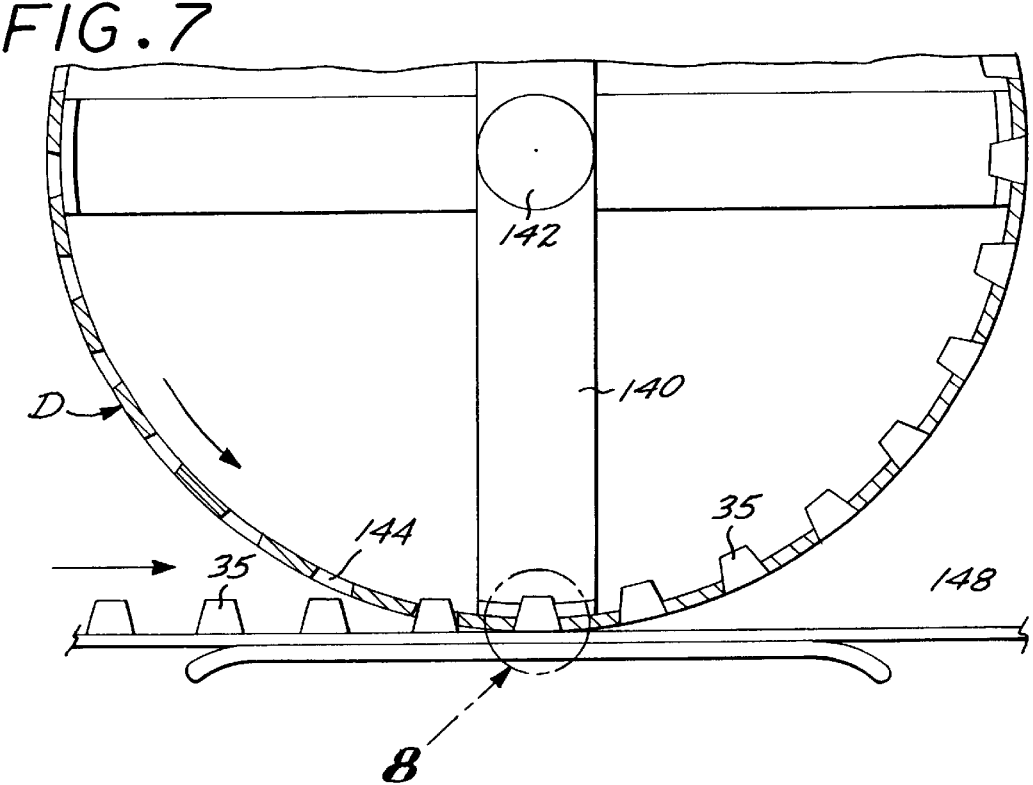
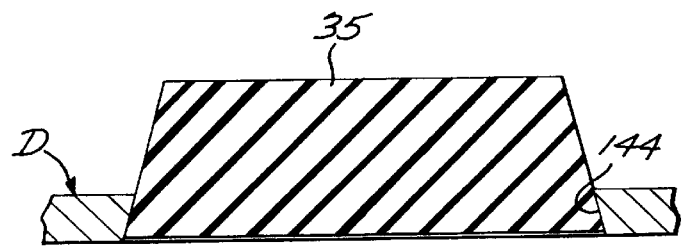
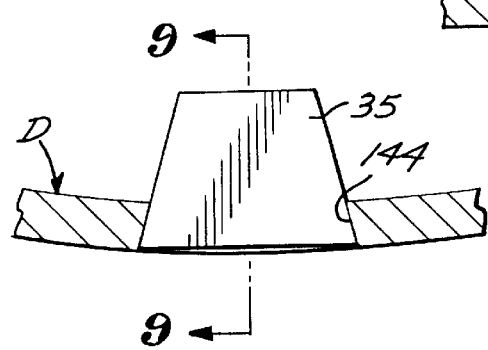
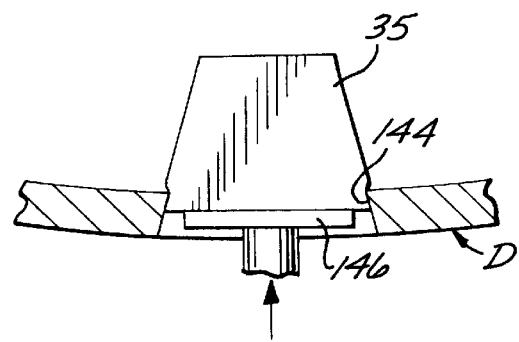

METHOD AND APPARATUS FOR MAKING AN ENDLESS RUBBER TRACTOR TRACK

BACKGROUND OF THE INVENTION

1. Field of the Invention

The present invention relates generally to the molding of vehicle supporting elements formed of rubber and more particularly, to a system for molding rubber tractor tracks in an endless configuration.

2. Description of the Prior Art

Molded rubber tractor tracks are in many cases being substituted for conventional metal tractor tracks. Rubber tractor tracks offer better maneuverability, better ride quality in rough fields, better flotation in wet fields, improved side hill stability, excellent traction, low maintenance and versatility compared to steel tractor tracks. Additionally, rubber tracks are replacing conventional rubber tires on tractor and other agricultural vehicles such as combines, trenchers, snow removers, spreaders, sprayers, wagons and carts, since rubber tracks are more friendly to agricultural fields, offer better flotation and less compaction than rubber tires, resulting in better crop yield. The use of rubber tractor tracks permits farmers to get out into the fields earlier in the planting season and plant more crops as compared to rubber tire-equipped agricultural vehicles.

Rubber tractor tracks are defined by an endless rubber belt reinforced with continuous flexible steel cables bonded into the rubber. With present commercial methods, a complete rubber tractor track is molded flat in quarter sections which are sequentially then bonded together during the curing process. In practice, the joint between the bonded-together sections tend to break in use. Additionally, the joint between the bonded-together ends is of a different cross-sectional dimension than the cross-sectional dimension of the major portion of the track length. Accordingly, during movement of the track-supported vehicle, the vehicle is subject to severe vibrations. Such vibrations are not only harmful to the vehicle, but also to pavement over which the vehicle is moved. Additionally, such vibration is annoying to the vehicle operator.

Another method involves building a complete track using a drum. Uncured or cured lugs are first manually clamped within pockets formed in the drum. Next, uncured rubber, calendered cord and wire cable are wrapped around the outside of the drum. Preformed uncured treads are then stitched onto the uncured rubber. The drum is then disposed within an autoclave to cure the rubber and the parts attached thereto. The drum is then collapsed to remove the completed track. Since only low pressure can be applied the cured rubber is of a low density with resulting low strength. Also, the track lugs and treads are not generally integrally bonded to the rubber and are displaced during use.

SUMMARY OF THE INVENTION

The method and apparatus for molding rubber tractor tracks of the present invention effects complete molding of an entire rubber track in an endless configuration of uniform thickness so as to eliminate any discontinuity in cross-section along the length of the rubber track. As a result, a rubber track embodying the present invention eliminates the vibration created by the bonded-together sections of a conventional rubber tractor track during vehicle movement. Additionally, a rubber tractor track embodying the present invention is not subject to breakage as in the case of a conventional rubber tractor track formed of bonded-together sections. Moreover, a rubber tractor track made in accordance with the present invention is completely integral with respect to the lugs and treads whereby the lugs and treads will not become separated from the track.

Another advantage of the method of molding rubber tire tracks embodying the present invention is the reduction in manufacturing time and cost afforded by such method, as compared to the prior art methods described above.

This advantage is broadly achieved by molding an initially uncured belt, securing drive lugs to the inner periphery of the uncured belt, inserting the uncured belt and its drive lugs into a molding press, heating the molding press to mold treads on the outer portion of the belt while forming and bonding the drive lugs to the inner portion of the belt, and then removing the cured belt and its drive lugs from the molding press.

The apparatus of the present invention includes a molding press having a lower platen that includes plurality of horizontally movable outer molding segments formed with tread-defining recesses on their inner portions, and a plurality of horizontally movable inner molding segments, each molding segment having drive lug cavities that initially removably hold rough-formed drive lugs. The apparatus also includes a belt handler for positioning an uncured belt within the confines of the outer and inner molding segments, a power-operated drive lug loader to urge the drive lugs radially inwardly to further form and secure the drive lugs against the inner periphery of the uncured belt, power-operated means on the lower platen to urge the outer molding segments against the outer surface of the uncured belt, backing means on the molding press top to restrain the inner and outer segments against separation. Heating means on the molding press effects curing of the belt between the inner and outer molding segments while forming the treads on the outer surface of the belt and final forming and bonding the drive lugs onto the inner portion of the belt. The belt handler removes the cured belt from the lower platen.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 7 is a broken side view taken in enlarged scale along line 7—7 of FIG. 3;

FIG. 8 is an enlarged view of the encircled area designated 8 in FIG. 7;

FIG. 9 is a vertical sectional view taken along line 9—9 of FIG. 8;

FIG. 10 is a view similar to FIG. 9 showing a drive lug being urged into the drive lug drum;

DETAILED DESCRIPTION OF THE PREFERRED EMBODIMENTS

Figure 28:
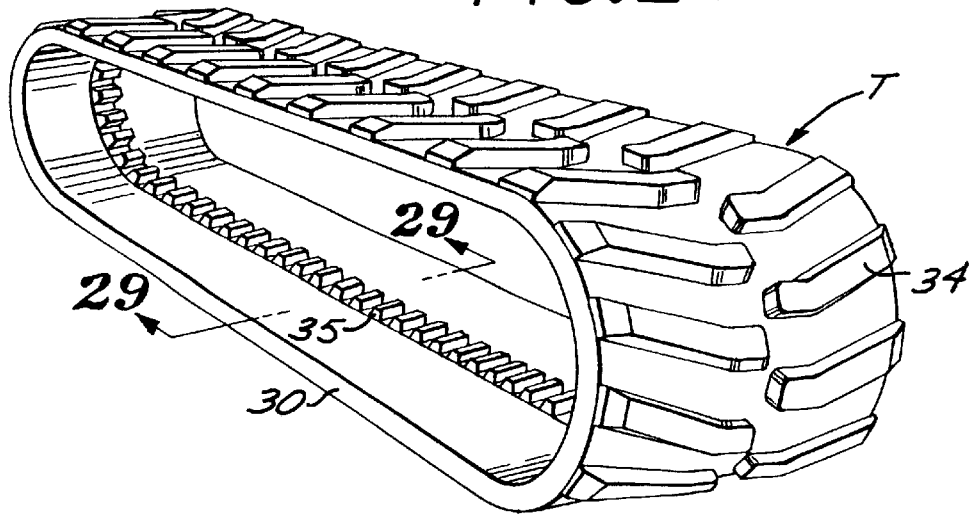
FIG. 28 is a perspective view showing a completed rubber tractor track made in accordance with the present invention.
Figure 29:
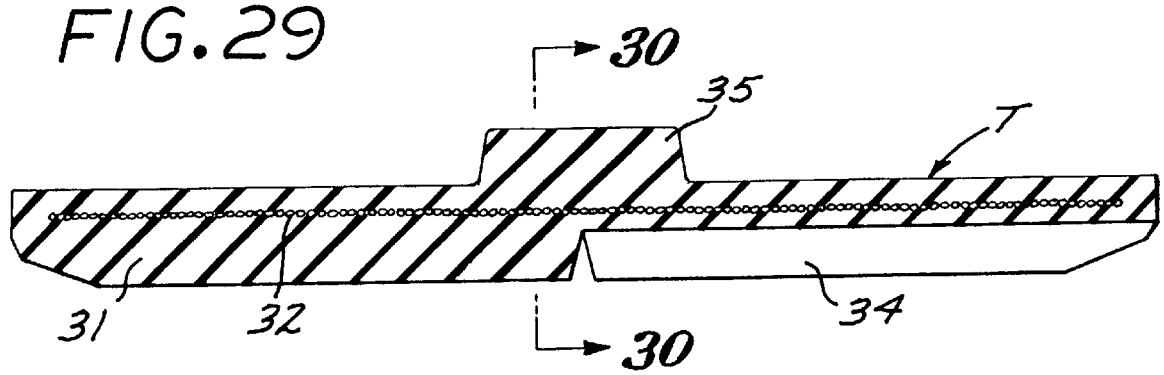
FIG. 29 is a vertical sectional view taken in enlarged scale along line 29—29 of FIG. 28.
Figure 30:
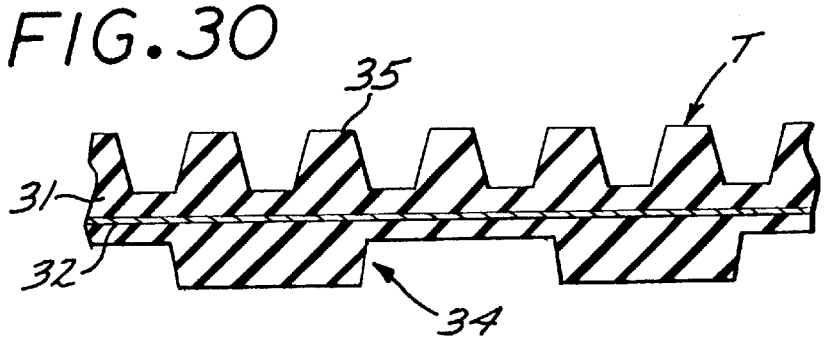
FIG. 30 is a vertical sectional view taken along line 30—30 of FIG. 29.

Referring to the drawings, in FIGS. 28, 29 and 30, there is shown a completed a rubber track T made in accordance with the method and apparatus of the present invention. Such track T comprises an endless band 30 formed of rubber 31 and calendered cord and wire cable 32 embedded in band 30. Such track T is adapted to be positioned upon the wheels and rollers of a motorized vehicle (not shown), such as a tractor or the like to support such vehicle for movement along a desired surface, such as an agricultural field. The exterior surface of band 30 is formed with integral treads 34. The mid portion of the interior periphery of band 30 is formed with a plurality of drive lugs or guide lugs 35 which engage complimentary sprockets (not shown) on the wheels or rollers of the vehicle which is supported by track T.

Track T of FIGS. 28, 29 and 30 is formed by the apparatus shown in FIGS. 1 through 27, 31 and 32. Referring to FIGS. 1 through 5, such apparatus is supported upon a concrete floor C and includes a molding press gantry MG horizontally movable along the floor C. The major components of the track forming apparatus embodying the present invention includes a molding press having a lower platen, generally designated 40, and a mold top member, generally designated 42, a belt handler BH carried by a jib crane JC and a drive lug drum D and drive lug loader L and a second jib crane JC-2. The molding press gantry MG effects vertical and horizontal movement of the molding press top member 42 relative to the molding press lower platen 40. Belt handler BH is swung from a first position over a conveyor belt 44 to a second position aligned with lower platen 40 so as to move uncured belts 45 from the conveyor belt into the lower platen. After a molding operation, belt handler BH removes a cured tractor track T from the lower platen 40 to a position over the conveyor belt 44 to transfer a cured track T onto the conveyor belt.

More particularly, as shown in FIGS. 1 through 5, molding press gantry MG is of conventional construction having crossbars which support, vertical, like, equidistantly spaced electric motor driven-lifting screw rods 46. Another electric motor drives rollers 48 which ride on rails 49 secured to columns 50.

Figure 13:
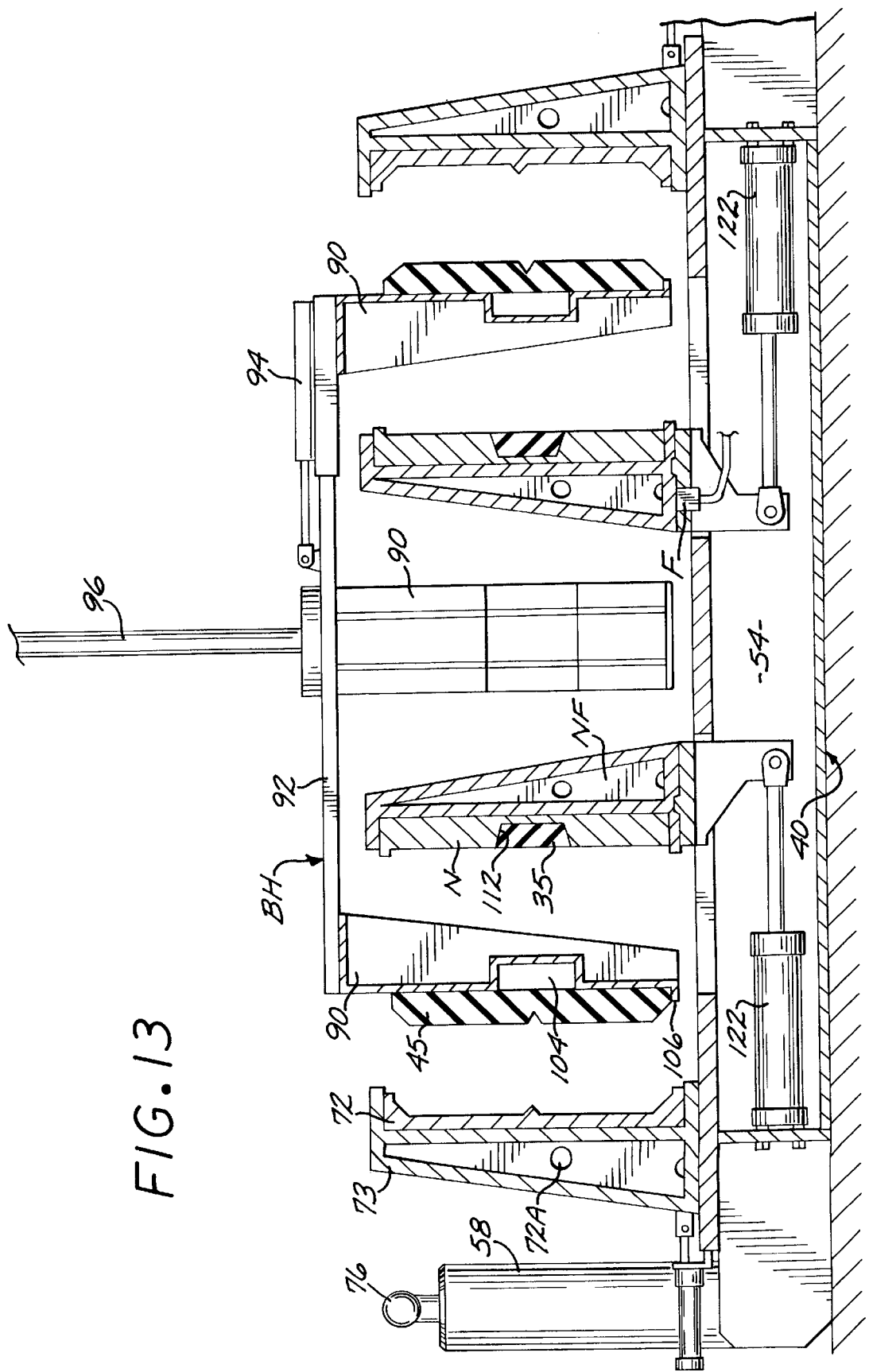
FIG. 13 is a cross-sectional side view showing the belt handler lowering an uncured belt into the lower platen.
Figure 14:
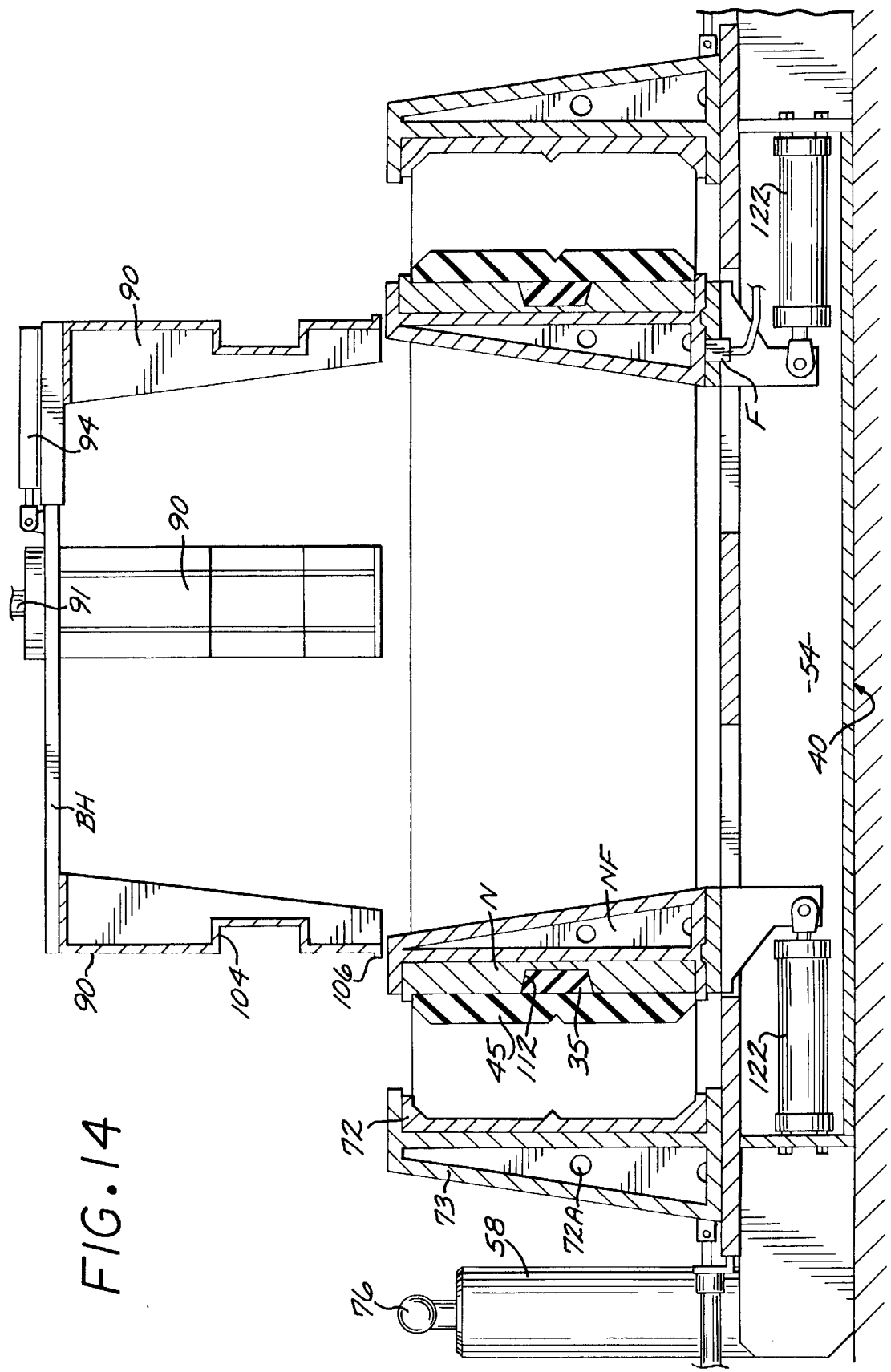
FIG. 14 shows the belt handler raised from the lower platen.
Figure 15:
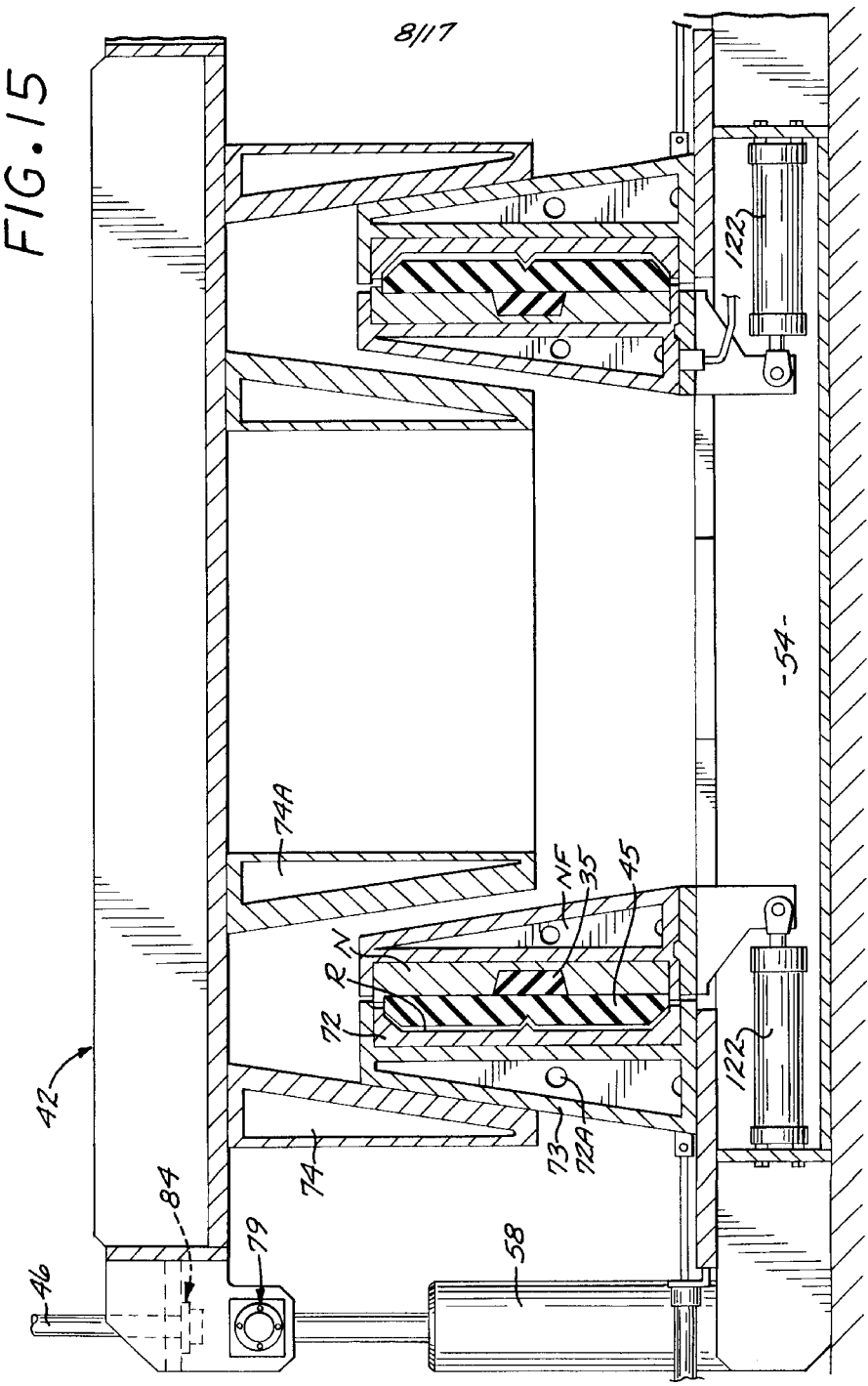
FIG. 15 is a cross-sectional side view showing the molding press top being lowered on the molding press lower platen.

Referring also to FIGS. 11 through 16, lower platen 40 is disposed within a depression formed in floor C and includes a base 54. A plurality of like, outer hydraulic cylinder and plunger closing units 58 extend upwardly from the sides of the lower platen 40. The molding press top 42 is lifted onto and off of the lower platen by the vertically reciprocal lifting screw rods 46 of gantry MG. A plurality of horizontally extending fluid actuated cylinder and plunger units 71 are secured to the lower platen 40 to effect horizontal movement of a plurality of outer molding press segments 72 which are secured to frusto-conical steel heat-transfer hollow cones 73 relative to the floor of the lower platen. A plurality of outer hollow outer backing cones 74 and inner backing cones 75 depend from the underside of press top 42 (FIG. 15). The inner surface of each of the molding press segments 72 is formed with recesses R which shape the treads 34 of the completed tractor track T.

Figure 17:
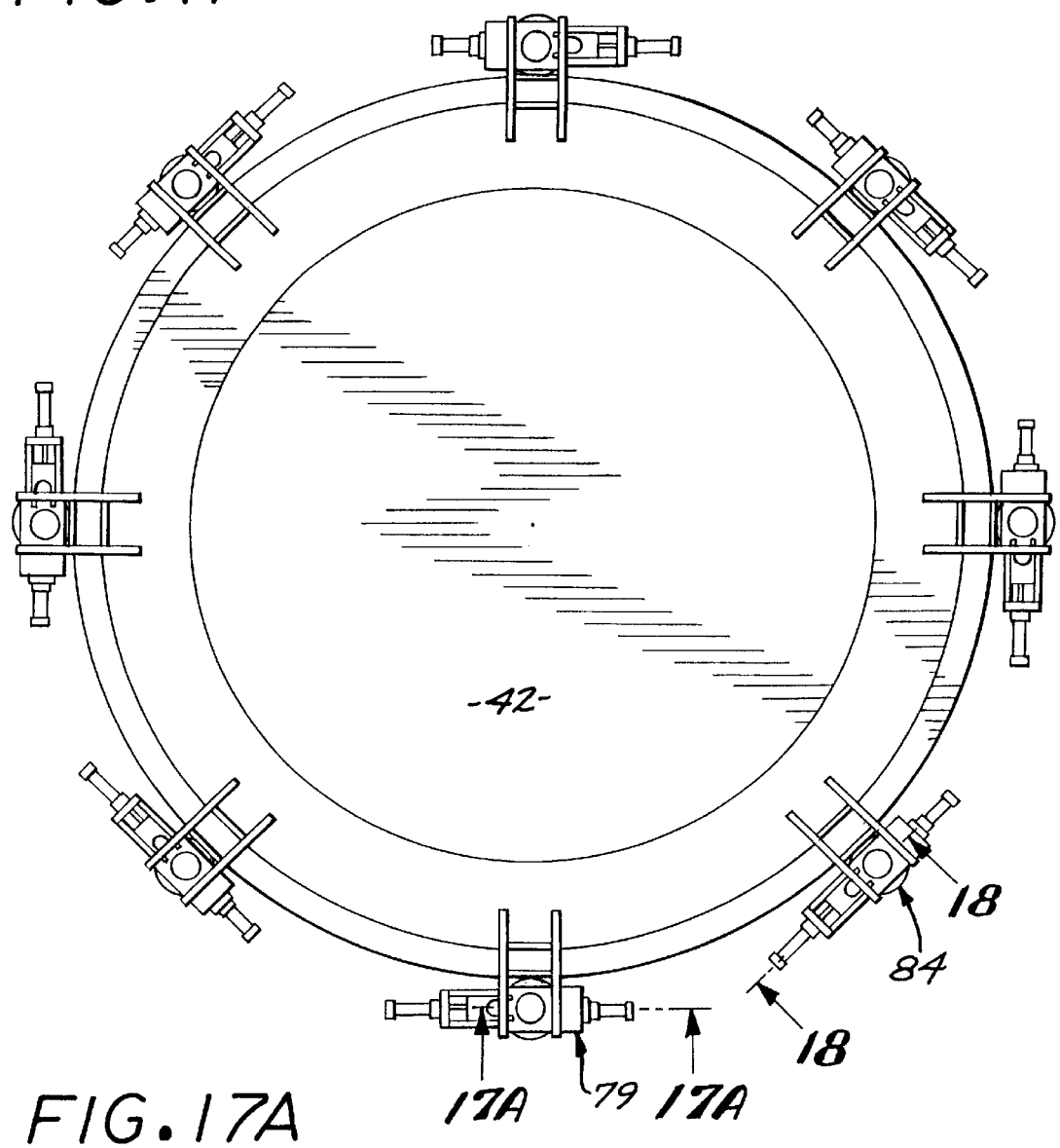
FIG. 17 is a top plan view of the molding press.
Figure 17A:
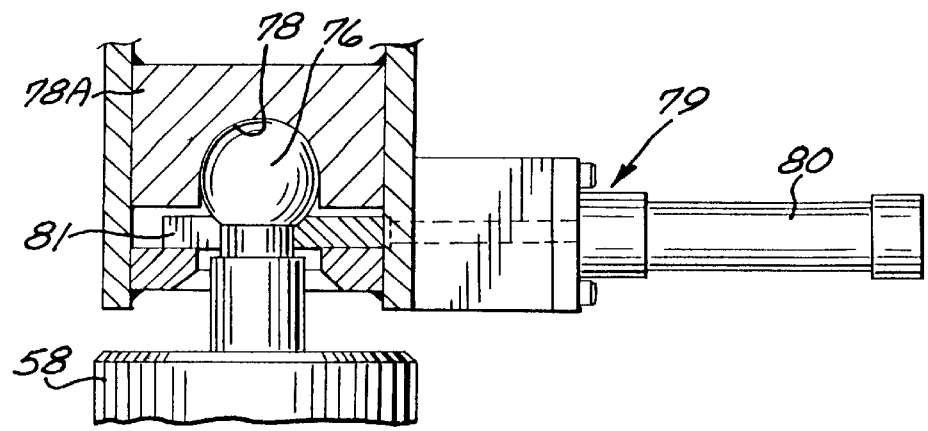
FIG. 17A is a broken vertical sectional view taken in enlarged scale along line 17A—17A of FIG. 17.
Figure 18:
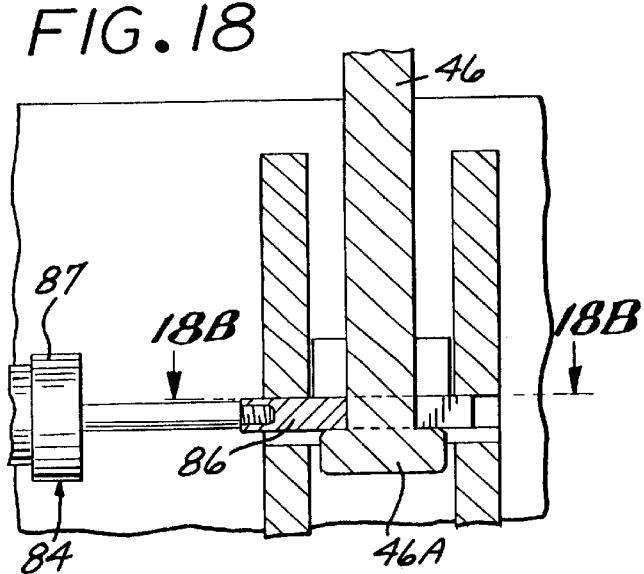
FIG. 18 is a vertical sectional view taken in enlarged scale along line 18—18 of FIG. 17.
Figure 18B:
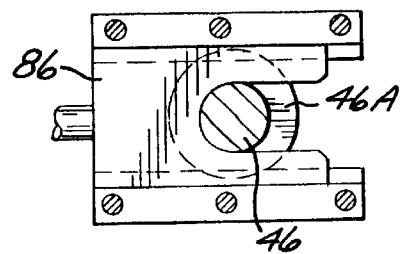
FIG. 18B is a horizontal sectional view taken along line 18B—18B of FIG. 18.

Referring to FIGS. 17 and 17A, the upper ends of the plungers of the closing cylinder and plunger units 58 are formed with knobs 76 which are releasably locked within complementary sockets 78 formed in blocks 78A supported on the outer periphery of mold top 42. A plurality of fluid-operated locks 79 arranged around the periphery of the mold top each includes a conventional fluid-actuated cylinder 80 that moves a U-shaped horizontal plate 81 towards and away from the underside of the knobs 76 to connect and disconnect the cylinder and plunger units 58 to the mold top 42.

Referring to FIGS. 17, 18, 18A and 18B, a plurality of fluid actuated locks 84 are attached to molding press top 42 above locks 79 to removably secure the lower ends of lifting screw rods 46 of molding press gantry MG to the molding press top. Locks 84 include U-shaped plates 86 that are extended over the lower end of lifting screw rods 46 to engage an enlargement 46A formed on the lower end of the lifting screw rods 46 by means of conventional fluid-actuated horizontal cylinder and plunger units 87.

Referring now to FIGS. 13 and 14, the belt handler BH, includes four vertical retractable fingers 90 horizontally slidably carried by horizontal X-shaped carrier 92. The upper end of each retractable finger 90 is horizontally slidably supported on one leg of the carrier. Movement of the fingers 90 is effected by conventional fluid-actuated cylinder and plunger units 94. A lifting screw rod 96 is rigidly secured to the center of carrier 92. The upper end of lifting screw 96 is threadably connected to a electric motor-driven nut member 101 (FIG. 1) secured to the free end of the boom of jib crane JC that supports the belt handler whereby rotation of the nut member effects vertical reciprocation of the lifting screw rod 96. The outer surface of each of the fingers 90 is formed with a drive lug pocket 104. The lower end of each finger is formed with a lip 106 that engages and supports the lower end of an uncured belt 45.

Referring to FIGS. 11 through 16, lower platen 40 includes a circumferentially arranged plurality of truncated frusto-conical hollow narrow segments N and wide segments W secured to and supported by hollow cones NF. Each segment has an upwardly and outwardly sloping inner surface and a vertically extending outer surface. The segments are formed of a metal having a high coefficient of thermal expansion such as aluminum or a combination of aluminum and steel. The mid-portion of the outer surface of each segment is formed with a drive lug cavity 112 which removably receives a rough-formed drive lug 35. The bottom of each narrow segment N is secured upon a shoe 114 having a bracket that extends through an opening 115 in the floor 116 of base 120 of the lower platen 40. The lower portion of each shoe bracket is secured to the plunger of a conventional fluid-actuated horizontally extending cylinder and plunger unit 122 having its outer end affixed to the inner periphery of the base 120. The wide segments W that removably hold an uncured drive lug 35 are similar in construction to the narrow segments and each are secured upon a shoe having a bracket that extends through floor opening 115.

Figure 1:
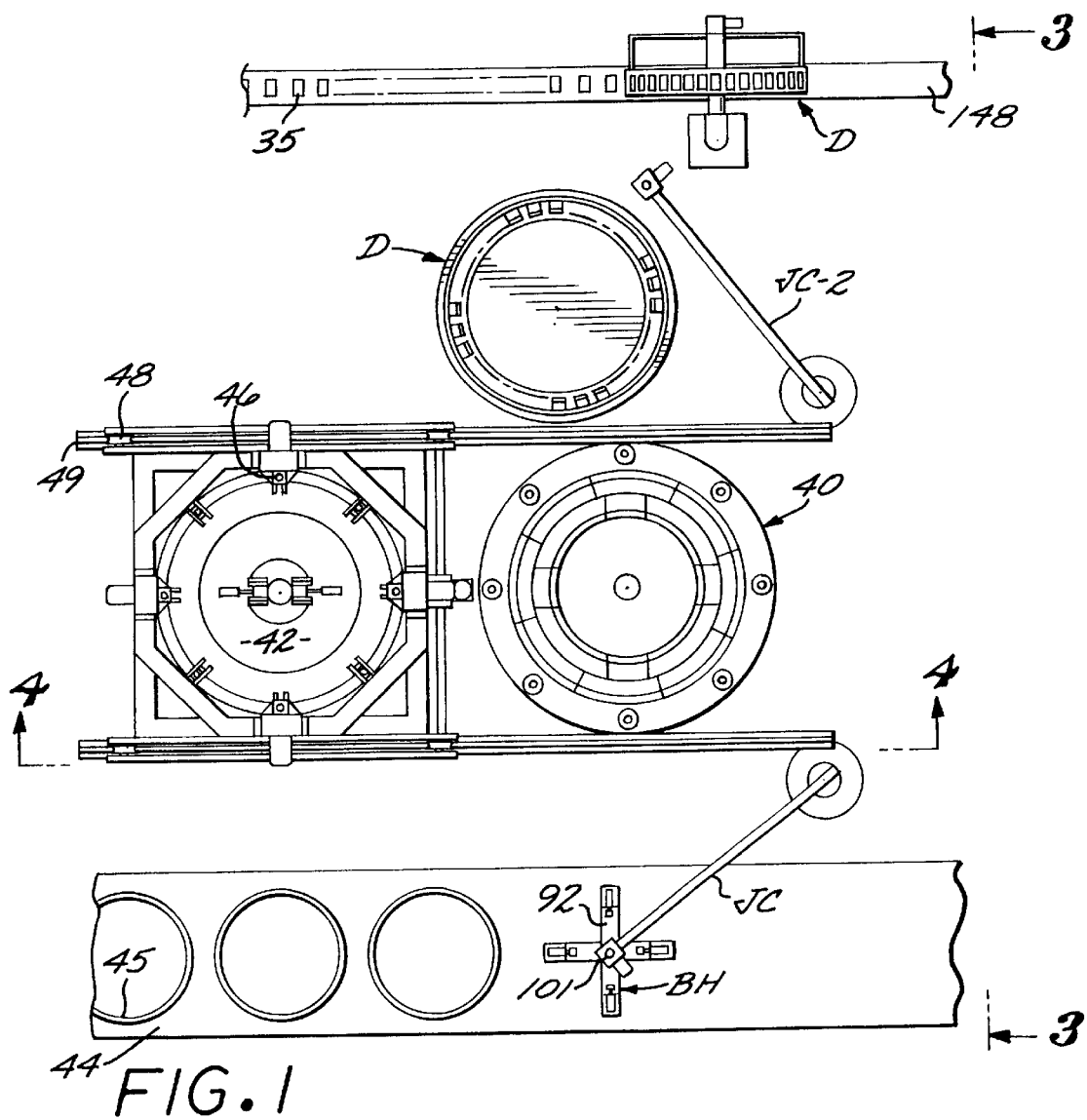
FIG. 1 is a top plan view of a preferred form of apparatus embodying the present invention.
Figure 2:
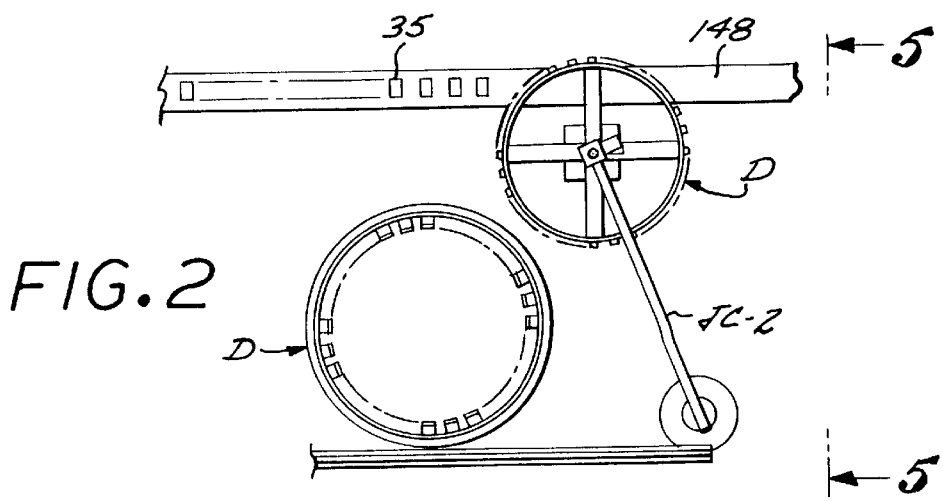
FIG. 2 is a fragmentary top plan view of such apparatus.
Figure 3:
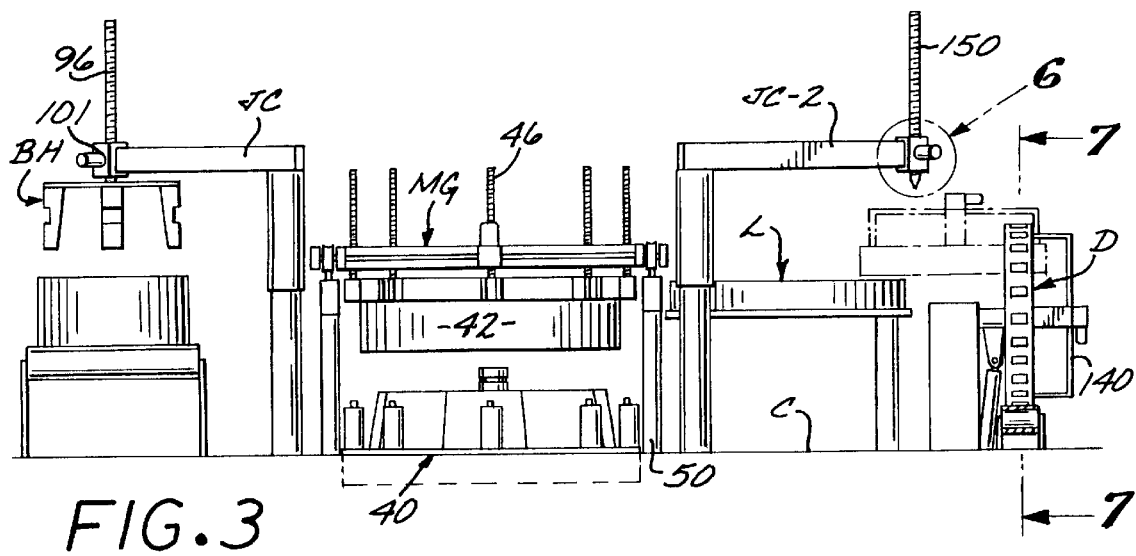
FIG. 3 is an end view taken along line 3—3 of FIG. 1.
Figure 4:
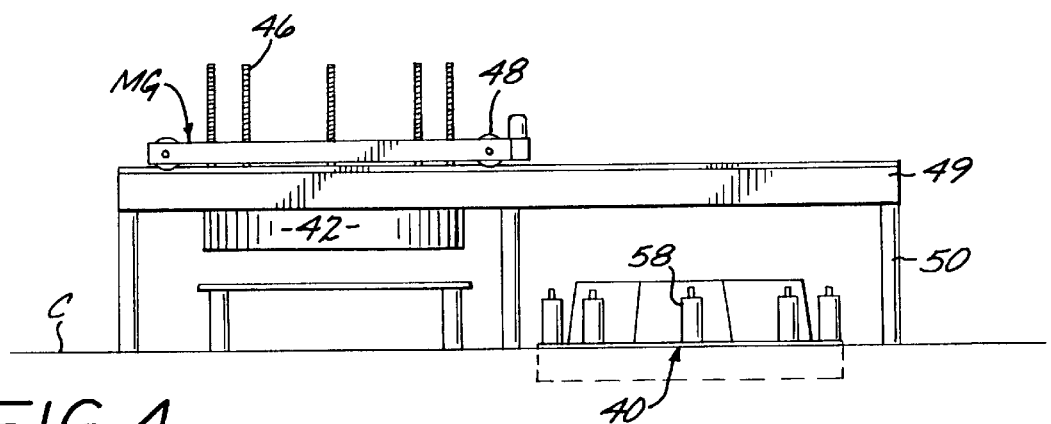
FIG. 4 is a side sectional view taken along line 4—4 of FIG. 1.
Figure 5:
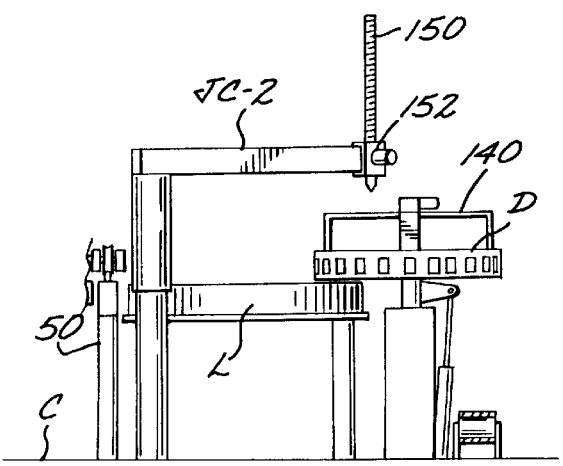
FIG. 5 is a broken vertical sectional view taken along line 5—5 of FIG. 2.
Figure 6:
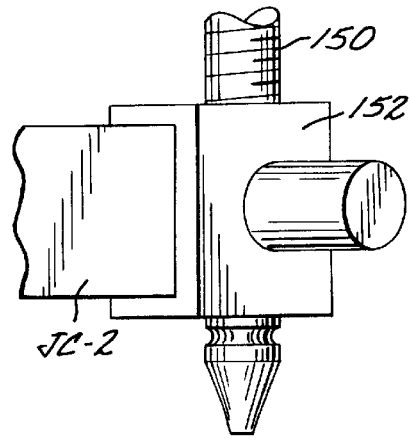
FIG. 6 is an enlarged view of the encircled area designated -6- in FIG. 3.
Figure 11:
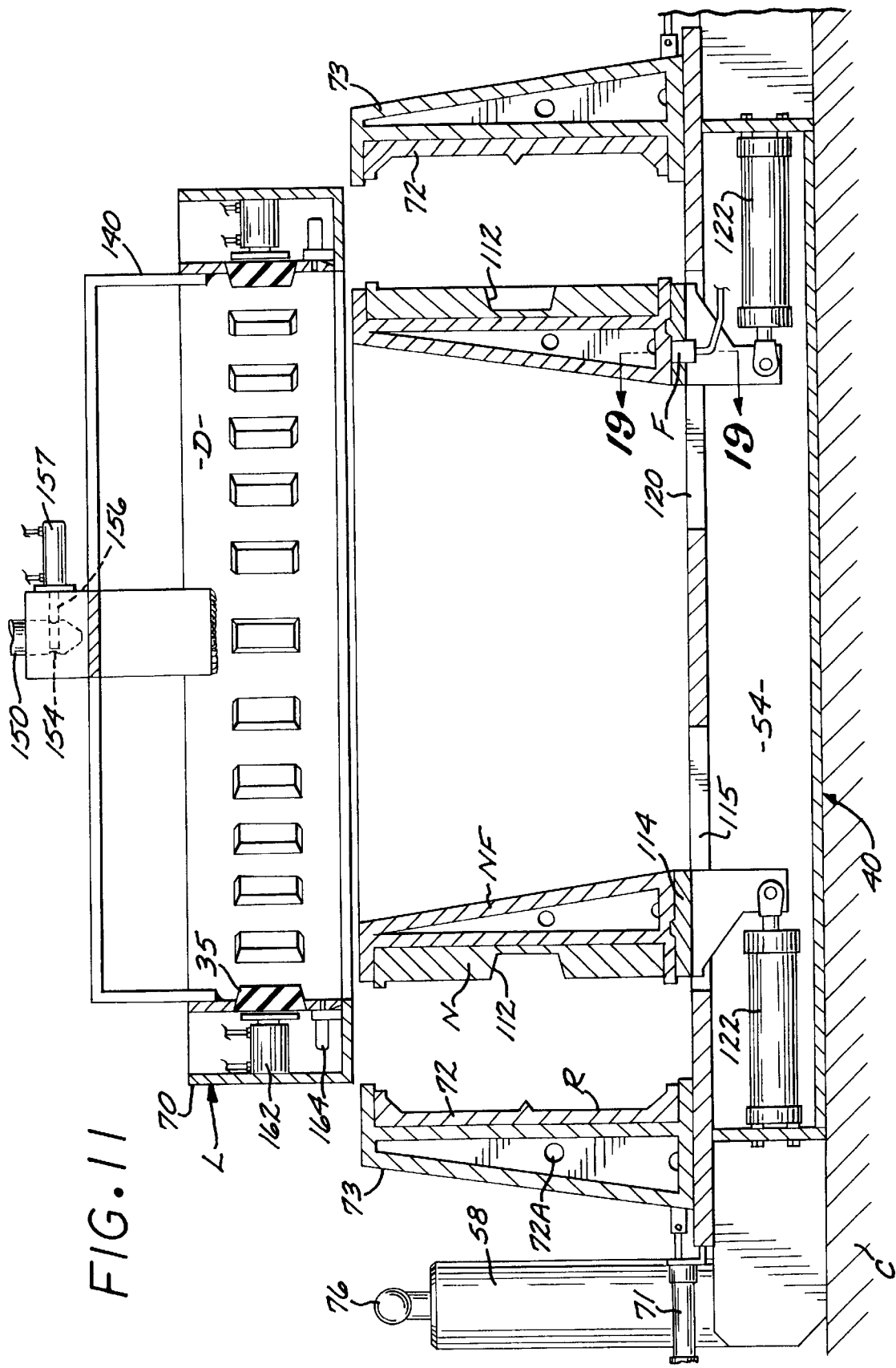
FIG. 11 is a cross-sectional side view showing the drive lug drum and drive lug loader positioned above the lower platen.
Figure 12:
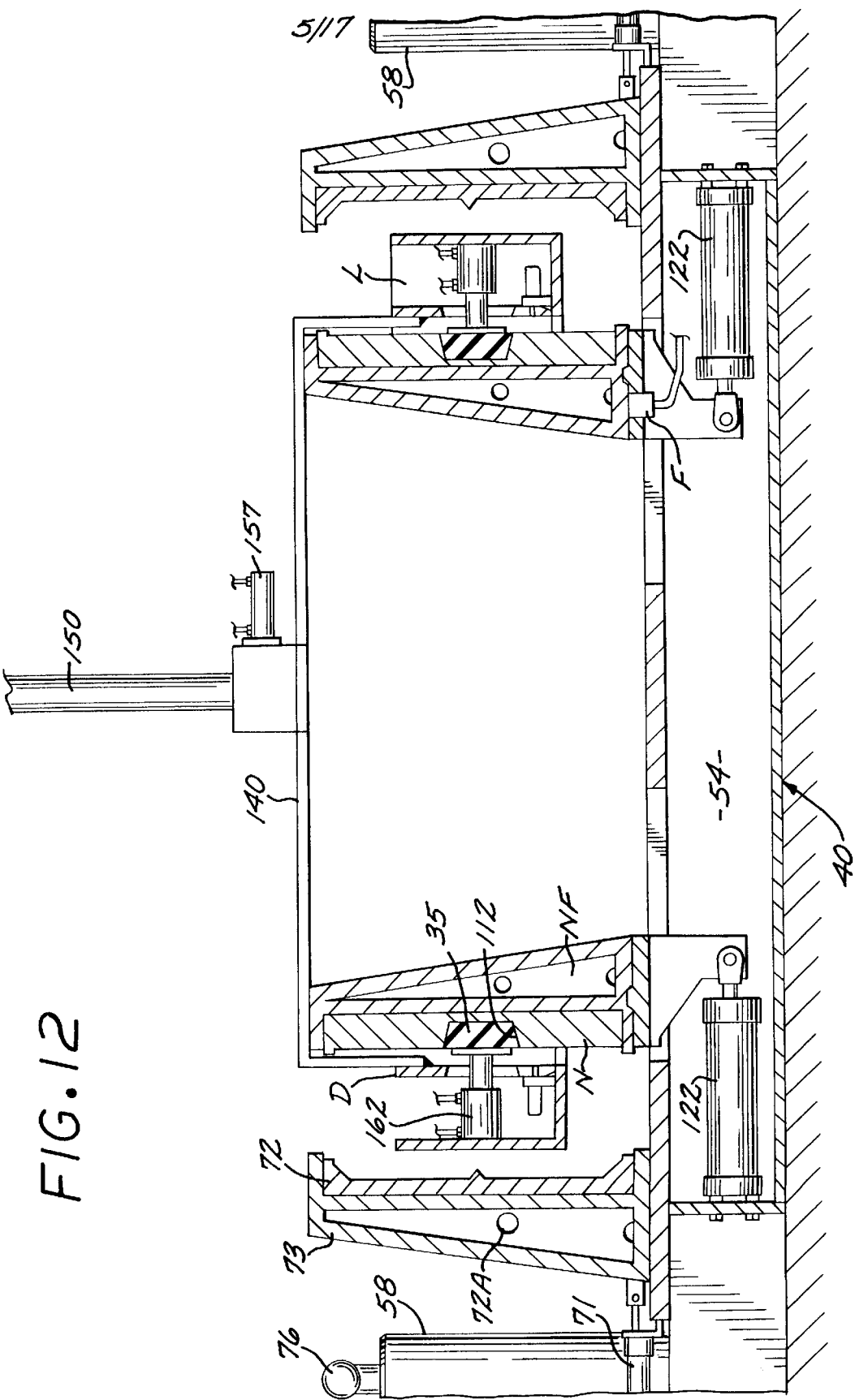
FIG. 12 is a cross-sectional view showing the drive lug loader encircling the inner molding segments.

Referring to FIGS. 1, 2, 3, 5 and 7 through 10, drive lug drum D is carried by cross-arms 140 which are centrally secured to an axle 142. The periphery of drum D is formed with a plurality of drive lug—receiving apertures 144 that removably receive rough-formed uncured drive lugs 35. Drum D is initially disposed in a vertically extending position shown in FIGS. 1 and 7 through 10 wherein drive lugs 35 are urged into apertures 144 by a power-operated plunger 146 as shown in FIG. 10 after being positioned in alignment with such apertures by a conveyor belt 148 (FIG. 7). Alternatively, the drive lugs may be inserted into the apertures manually. After the drive lugs 35 have been inserted into apertures 144 the drive lug drum D is swung into a horizontal position shown in FIG. 2 by jib crane JC-2. The free end of such crane is provided with a vertical electric motor-operated lifting screw 150 disposed within a box 152. The lower end of lifting screw 150 is formed with a groove 154 that is selectively engaged with a pin 156 that is horizontally movable by a power-operated cylinder 157 (FIGS. 1, 11 and 12).

Referring to FIGS. 1, 2, 11 and 12, drive lug loader L includes a double-walled ring 160 that supports a plurality of horizontally extending fluid-operated cylinder and plunger units 162. Ring 160 also carries a fluid-actuated lock 164 for releasably securing the ring to drive lug drum D. It should be noted that the drive lugs 35 may be supplied to the drive lug loader in a dimensionally more finished condition than shown in FIGS. 7–10. In this case, it would not be necessary to change the configuration of such drive lugs before the track molding step.

In the operation of the aforedescribed apparatus, jib crane JC-2 positions drive lug loader D with its drive lug-loaded drum D over lower platen 40 (FIG. 11), and then downwardly into the confines of the lower platen. The drive lugs 35 are then positioned within the drive lug cavities 112 of the inner segments N and W by cylinder and plunger units 162 as shown in FIG. 12. Thereafter, drive lug loader D is withdrawn from the lower platen. The drive lugs 35 are rough-formed with dimensions and volume that permit them to properly interfit with the drive lug drum apertures 144 and drive lug cavities 112.

Referring now to FIGS. 1, 13 and 14, as an uncured belt 45 approaches the molding apparatus on conveyor belt 44, fingers 90 of belt handler BH are retracted and the belt handler is lowered into an uncured belt. The four fingers 90 are then extended into engagement with the interior of the belt 45 and the belt is transferred from the conveyor belt to a position within lower platen 40 by jib crane JC. The inner segments W are extended to hold the belt, then the movable fingers 90 of the belt handler are then retracted by means of fluid actuated cylinder and plunger units 96. The belt handler is then lifted out of the lower platen (FIG. 14) and inner segments N are extended.

Referring now to FIG. 15, outward movement of the inner segments N and W by cylinder and plunger units 122 forces the outer surfaces of the rough formed uncured drive lugs 35 very tightly against the inner periphery of the uncured belt 45. This operation can occur at room temperature or below 100° F. In this manner, the drive lugs are securely attached to the inner periphery of the uncured belt and initially formed into their final shape. If desired, an adhesive or a layer of uncured rubber (not shown) may be interposed between the drive lugs and the belt.

Figure 16:
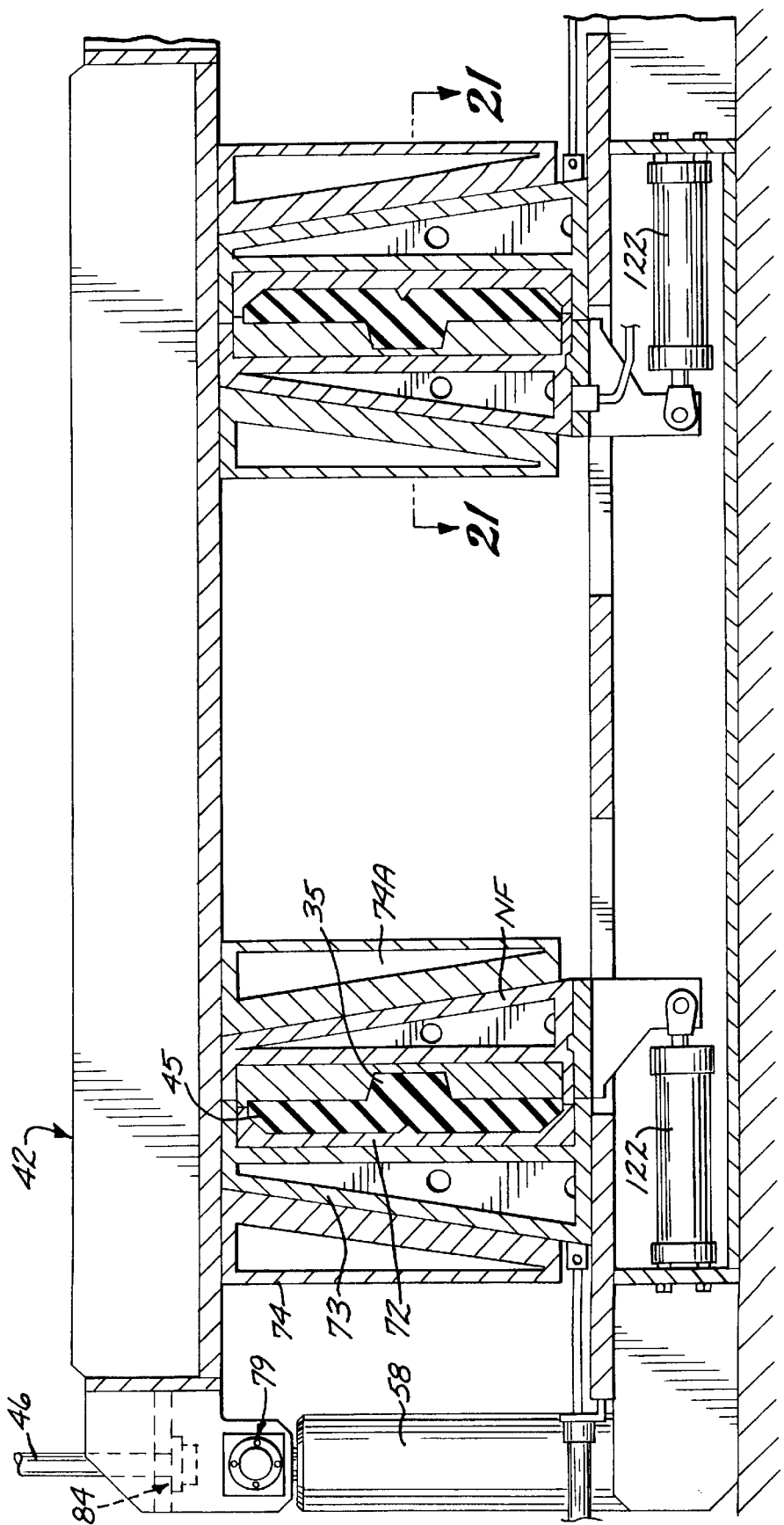
FIG. 16 is a cross-sectional side view of the molding press during a rubber tractor molding operation.

Next, as shown in FIG. 15, the molding press gantry MG will horizontally move the mold press top 42 to a position coaxial with the lower platen 40, and the lifting screws 46 of the mold press gantry MG lower the molding press top downwardly toward the lower platen 40 until the sockets 78 encompass knobs 76 of the cylinder and plunger units 58 (FIG. 17A). The U-shaped plates 81 are then advanced into a locked position below the knobs. The lifting screw rods 46 are disconnected from the molding press gantry by locks 79. The outer cylinder and plunger units 58 now urge mold top 42 into the lower platen 40 to close the molding press, and its outer segments as shown in FIGS. 15 and 16. Referring to FIG. 15, as the mold top 42 moves downwardly, outer cones 74 cam the matrix cones 73 inwardly to urge the outer segments 72 into contact with the outer surface of uncured belt 45 (FIG. 16).

Figure 23:
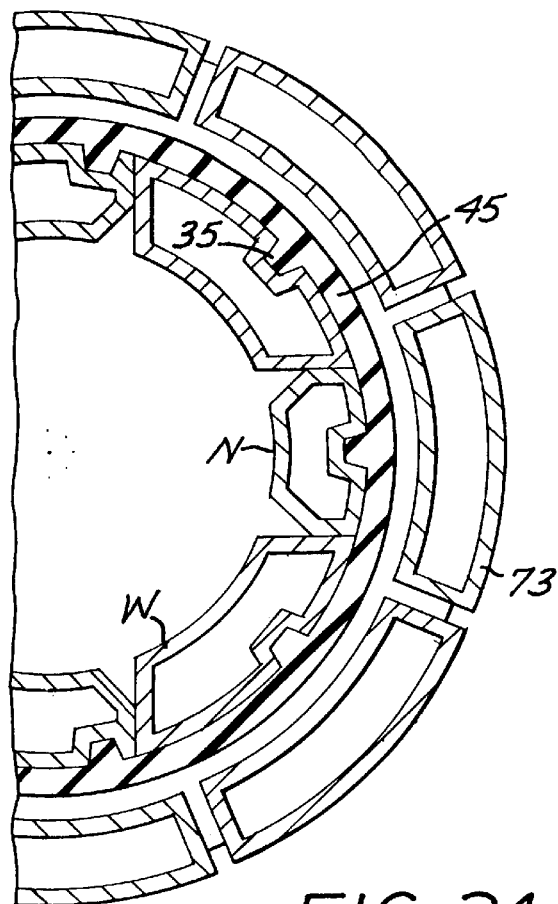

It should be noted that before the molding press is closed, the aluminum segments N and W are at about room temperature. Accordingly, segments N and W provide adequate clearance (⅛"–¼") to admit the uncured belt 45 and drive lugs 35. Previously, the outer cones 73 and hence outer molding press segments 72 will have been heated by steam or hot water through passages 72A to a desired temperature, and will remain heated during subsequent belt curing operations. The narrow and wide inner segments N and W will then be heated by steam through special fittings shown in FIGS. 19 and 20, described hereinafter so as to apply outward compressive force against the uncured belt 45, since the heated segments expand towards one another. The inner and outer backing cones 74 and 74A of the mold top restrain the inner and outer segments against relative horizontal movement. Thermal expansion of the inner and outer segments towards one another compresses and cures the belt 45 while forming treads 34 in the outer periphery thereof. At the same time, the drive lugs 35 are finally formed and cured and integrally bonded to the inside periphery of the belt (FIG. 12), and the calendered cord and wire cable 32 is bonded to the rubber. After the molding step, the mold top 42 is lifted upwardly out of the lower platen 40 by the outer cylinder and plunger units 58. Then the mold gantry MG returns the mold top to its original position of FIG. 1 by lifting rods 46. Next, the outer molding press segments 72 are retracted (FIG. 23). The cured belt T is in tight contact with the inner segments N and W at this time.

Figure 19:
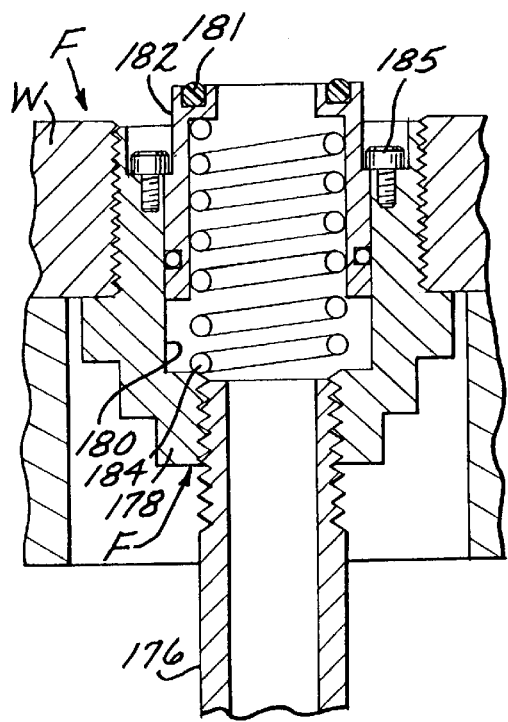
FIGS. 19 and 20 are vertical sectional views taken in enlarged scale along line 19—19 of FIG. 11.
Figure 20:
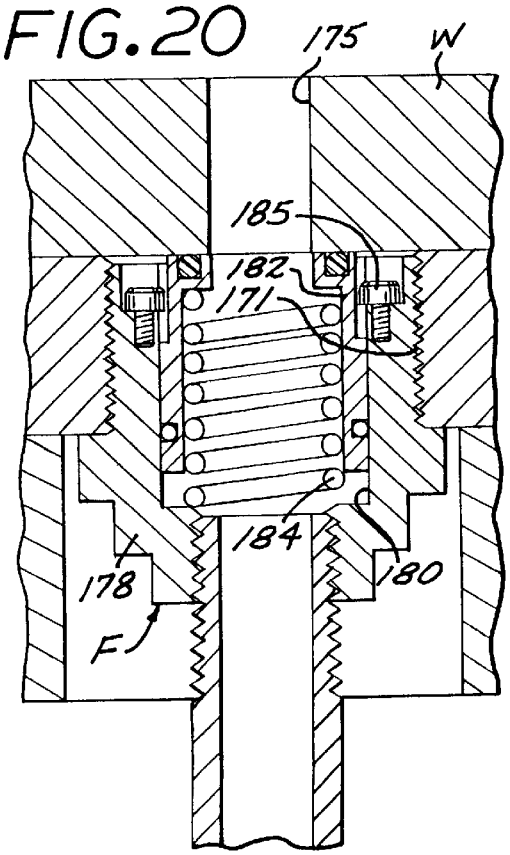
Figure 21:
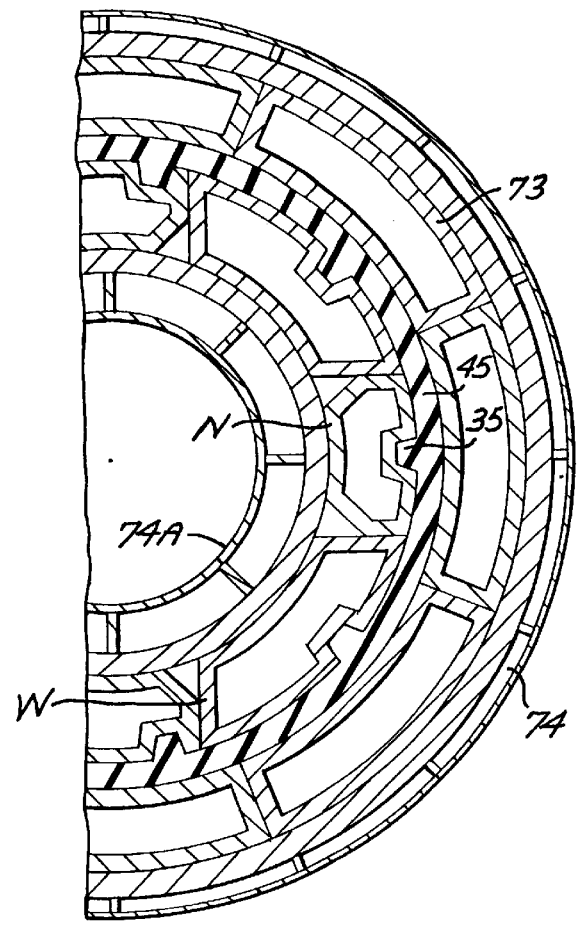
FIGS. 21-27 shown the parts of FIG. 16 as they are disposed during and after a rubber tractor track molding operation, with FIG. 21 being taken in enlarged scale along lines 21-21 of FIG. 16.
Figure 22:
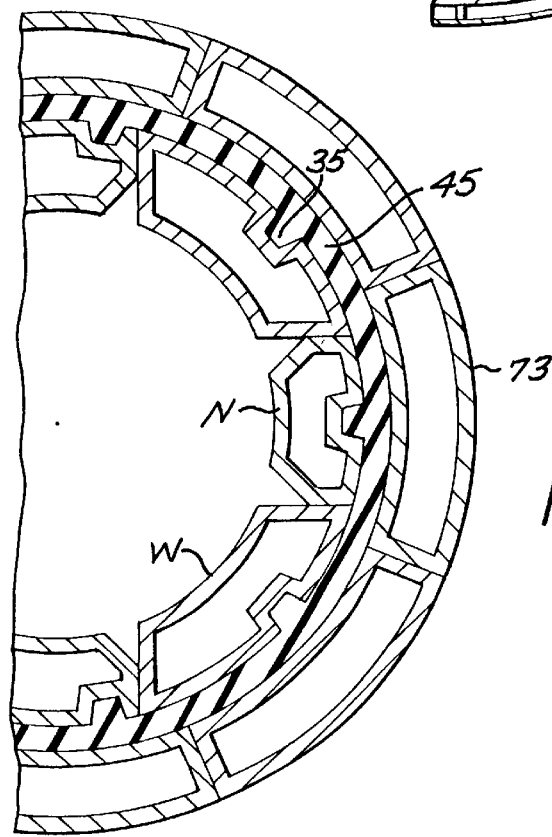
Figure 24:
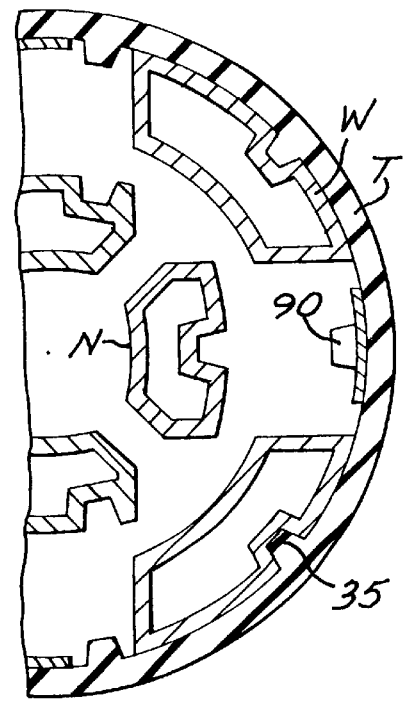
Figure 25:
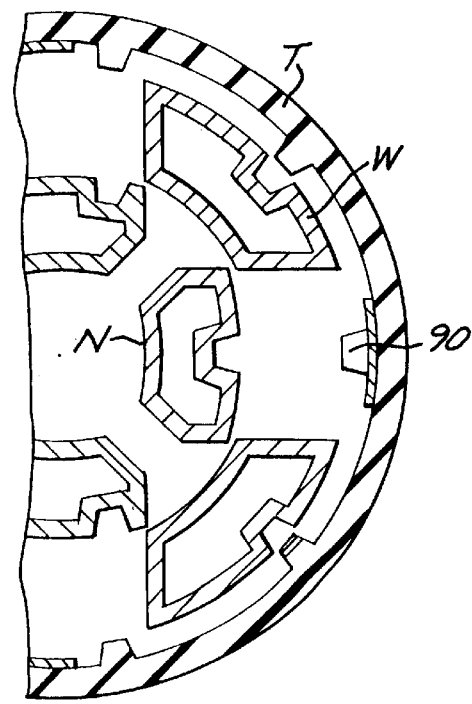

Cool water is then forced into one or more of the segments N and W by fittings F of the type shown in FIGS. 19 and 20 so as to cause such segments to shrink slightly away from the belt's inner periphery. The narrow segments N are then retracted by cylinder and plunger units 122 until there is sufficient clearance for the belt handler fingers 90 to be lowered into position and engage the cured belt T (FIG. 24). Wide segments W are then retracted by cylinder and plunger units 122, as shown in FIG. 25, so as to free the cured track T. Belt handler BH is then actuated to remove the cured track T from the lower platen and swing such track onto conveyer belt 44 by the boom of jib crane JC.

Figure 27:
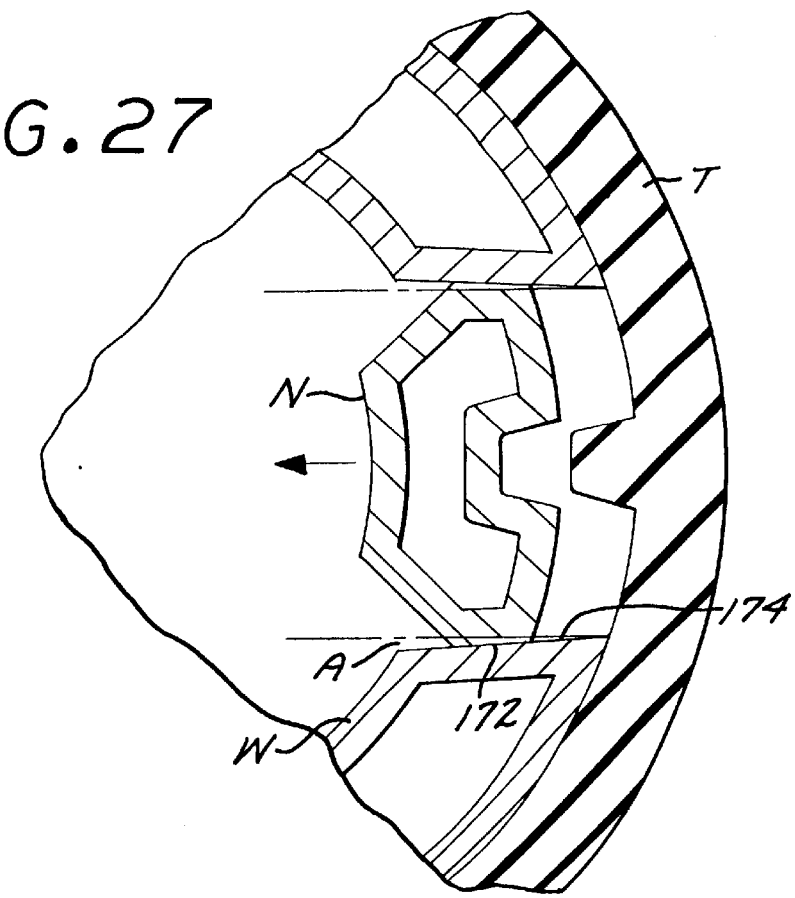
Figure 26:
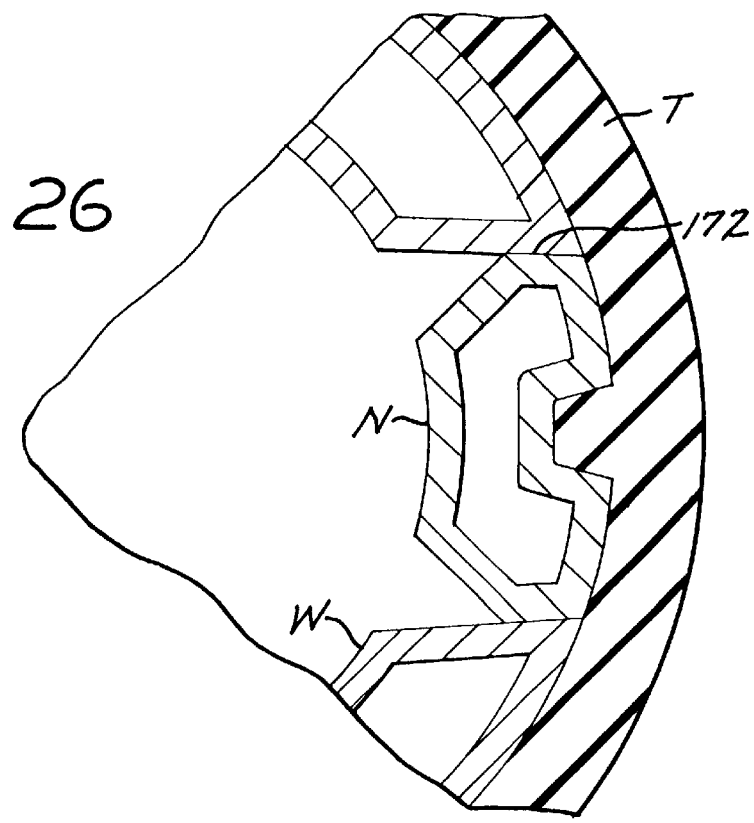

Referring to FIGS. 26 and 27, it will be noted the facing surfaces 172 and 174 of the narrow and wide segments N and W taper radially inwardly and outwardly at an angle A. With this arrangement, outward extension of the narrow segments N will urge the wide segments W tightly into a complete circle when the segments contact the inner periphery of an uncured belt. When a cured track T is to be removed from the segment assembly, such taper assists in retraction of the narrow segments.

Referring now to FIGS. 11 through 16, 19 and 20, steam and cooled water is admitted through bore 175 in the bottom of the removable segments N and W by the fitting F shown in FIGS. 19 and 20. Fitting F includes a pipe 176 attached to a boss 178 that is threaded to the floor of the mold bottom 40 coaxial with aperture 171 of the latter. Boss 178 has a cavity 180 wherein is slidably disposed a sleeve 182. Sleeve 182 is biased upwardly by a coil spring 184 relative to cavity 180. An O-ring 181 is carried by the upper end of sleeve 182. Stop screws 185 limit upward movement of sleeve 182. When segment W is initially secured to show 114, sleeve 182 will be pushed downwardly into cavity 180 and steam or cold water can flow through pipe 176 into the segments. A second O-ring 183 in sleeve 182 prevents steam form flowing between the sleeve and the fitting F. A similar arrangement is provided for narrow segments N. The use of the aforedescribed fittings F permit easy and rapid interchangeability of different inner and outer segments N and W without the need to re-plumb the steam and cool water supplies.

Figure 31:
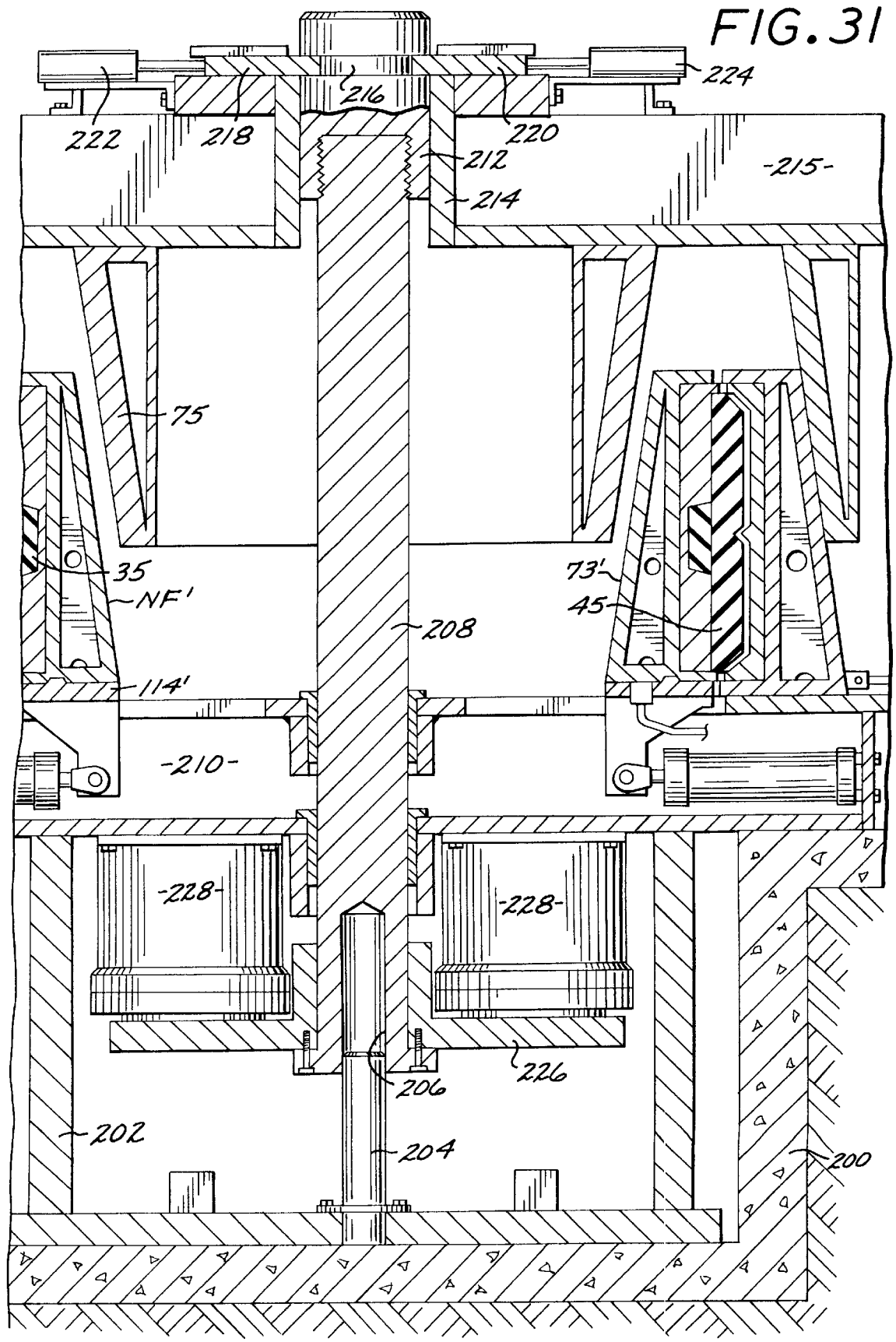
FIG. 31 is a cross-sectional side view of a modification of the molding press of the present invention with the mold top raised.
Figure 32:
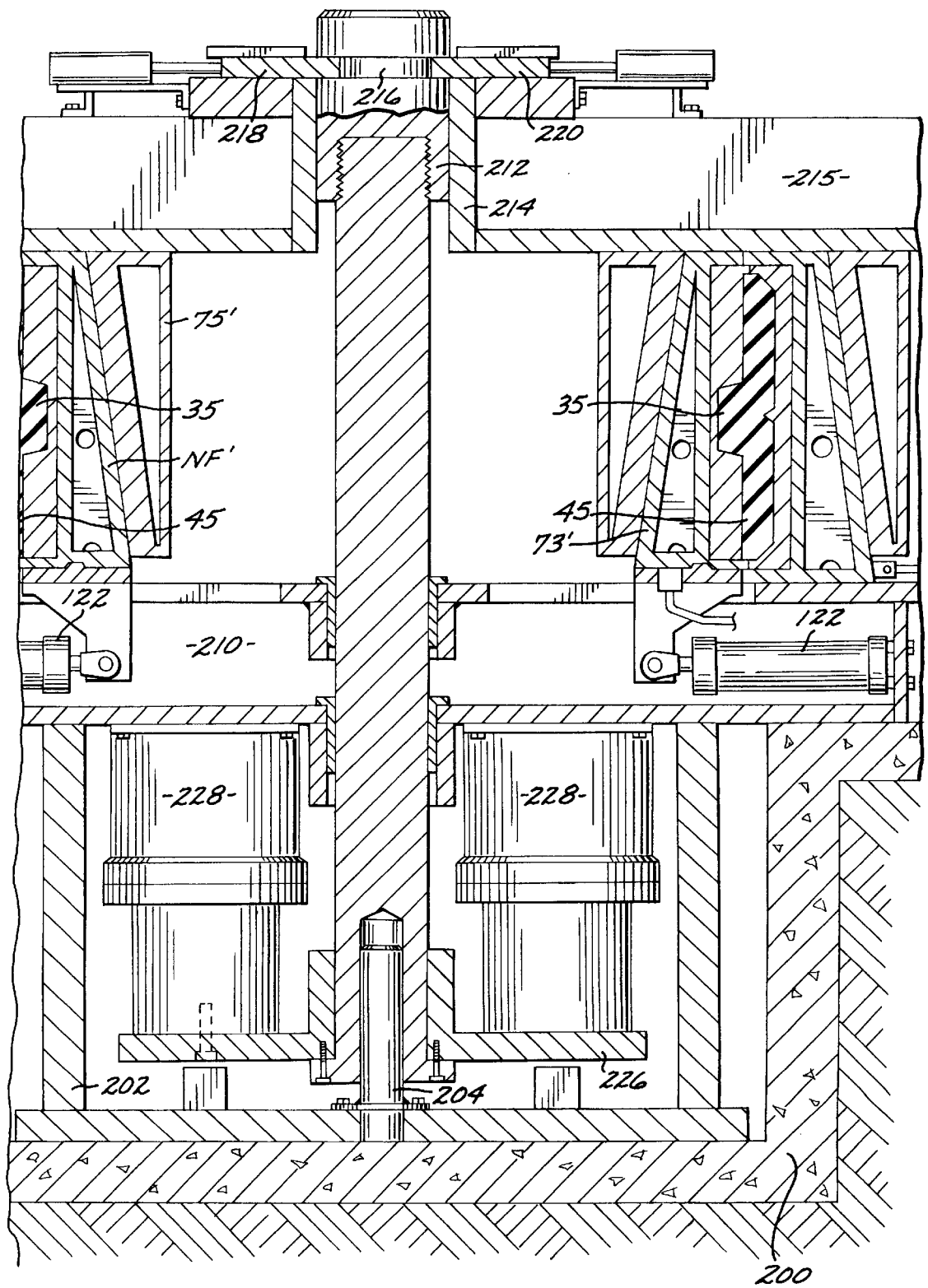
FIG. 32 is a view similar to FIG. 31 with the molding press closed.

Referring now to FIGS. 31 and 32, there is shown a modification of the molding press shown and described hereinbefore with like elements bearing primed reference numerals. Such modification is adapted for use in forming larger, wider, or heavier rubber tracks, and the molding press will generally be of increased weight as compared to the molding press shown and described hereinbefore.

The lower platen 210 of the molding press is supported upon a cylindrical concrete base 200 which surrounds a cylindrical steel shell 202 having its upper end secured to the underside of the base. Shell 202 coaxially supports a shaft 204 that vertically slidably engages a bore 206 formed in the lower portion of a guide post 208 which extends upwardly through the lower platen 210. The top of the guide post 208 is secured to a locking barrel 212 to centrally align sleeve 214 of mold top 215 with the lower platen. Locking barrel 212 is formed with a groove 216 that removably receives a pair of U-shaped locking plates 218 and 220 which are moved towards and away from groove 212 by horizontal fluid-actuated cylinder and plunger units 222 and 224 to secure mold top 215 to guide post 208.

The lower end of guide post 208 is fixed to a bracket 226 which carries a plurality of vertical fluid-actuated pull-down cylinder and plunger units 228. The upper ends of such cylinders are secured to the underside of the lower matrix 210.

The operation of the modified molding press is similar to that of the molding press of FIGS. 1–27. The outer cylinder and plunger units 58 raise the mold top 42' away from the lower matrix 210 after a molding operation to ben engaged by the molding press lifting screw rods (FIG. 31). Both the outer cylinder and plunger units and the inner pull-down cylinder and plunger units pull the mold top downwardly into a closed position (FIG. 32).

The aforedescribed apparatus and method will produce an endless rubber tractor track of uniform cross-section which eliminates excessive vibration and remains integral during use over a long service life. Production of such rubber tractor tracks can be accomplished in a minimum amount of time and at a comparative low cost compared to existing rubber track making systems.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A method of making an endless tractor track having treads on its outer portion from an initially uncured rubber belt and a plurality of rough-formed drive lugs, such method including the steps of:

providing outer molding segments having recesses to form treads on the outer portion of the belt;

providing inner molding segments having drive lug cavities on their outer sides;

positioning the uncured belt between the molding segments;

providing a drive lug support that removably receives the drive lugs;

positioning such drive lug support radially outwardly of the inner molding segments;

urging the drive lugs out of the drive lug support into the drive lug cavities of the inner segments;

advancing the inner molding segments against the inner periphery of the uncured belt to partially form and secure the drive lugs to the inner periphery of the uncured belt;

heating the outer and inner molding segments to cure the belt while molding treads on the outer portion of the belt and final forming and bonding the drive lugs to the inner portion of the belt to form the endless tractor track; and removing the completed tractor track from between the molding segments.

2. A method as set forth in claim 1 wherein the belt is compressed between the molding segments during heating thereof.

3. A method as set forth in claim 1 which further includes cooling the inner segments to retract them away from the cured belt before the completed track is removed from between the molding segments.

4. A method as set forth in claim 2 wherein the molding segments are formed of aluminum.

5. A method of molding an endless tractor track having treads on its outer portion from an initially uncured rubber belt and a plurality of rough-formed drive lugs, such method including the steps of:

providing inner molding segments having drive lug cavities on their outer sides;

positioning the uncured belt between the molding segments;

providing an annular drive lug support that removably receives the drive lugs;

positioning such drive lug support radially outwardly of the inner molding segments;

urging the drive lugs out of the drive lug support into the drive lug cavities of the inner segments;

expanding the inner molding segments into engagement with the inner periphery of the uncured belt to partially final form and secure the drive lugs to such inner periphery;

advancing the outer segments into contact with the outer surface of the belt;

compressing the uncured belt between the inner and outer molding segments while heating the inner and outer molding segments to cure the belt while forming treads on the outer portion of the belt and finally forming and bonding the drive lugs onto the inner periphery of the belt; and withdrawing the cured belt from the molding press.

6. A method as set forth in claim 5 wherein the inner molding segments are cooled before being retracted away from the cured belt.

7. A method as set forth in claim 5 wherein one of the inner molding segments is retracted before the other inner molding segments are retracted.

8. A method as set forth in claim 6 wherein the inner molding segments include aluminum.

9. A method as set forth in claim 6 wherein one of the inner molding segments is retracted before the other inner molding segments are retracted.

10. A method as set forth in claim 7 wherein the molding segments include aluminum.

11. Apparatus for molding an endless tractor track having treads on its outer portion from an uncured rubber belt and a plurality of rough-formed drive lugs, said apparatus comprising:

a molding press having a plurality of horizontally movable outer molding segments formed with tread-defining recesses on their inner portions and a plurality of horizontally movable inner molding segments, each inner molding segment having a drive lug cavity that initially removably holds a drive lug;

a drive lug loader formed with a plurality of apertures that removably receive the drive lugs;

power-operated means on the drive lug loader that force the drive lugs out of the apertures into the drive lug cavities;

a belt handler for coaxially positioning an uncured belt outwardly of the inner molding segments of the segment loader;

power-operated means on the molding press to urge the inner molding segments outwardly to partially finally form and to retain the drive lugs against the inner periphery of the uncured belt; and heating means on the molding press to effect curing of the belt between the inner and outer molding segments while forming the treads on the outer surface of the belt and finally forming and bonding the drive lugs onto the inner portion of the belt.

12. Apparatus as set forth in claim 11 wherein the molding press includes means for compressing the uncured belt between the inner and outer segments during operation of the heating means.

13. Apparatus as set forth in claim 11 wherein the belt handler includes a plurality of vertical fingers that are selectively retractable whereby the plurality of fingers removably engage the inner periphery of the belt to effect movement thereof relative to the molding press.

14. Apparatus as set forth in claim 11 which further includes means for cooling the inner molding segments before the inner molding segments are retracted to free the cured belt.

15. Apparatus as set forth in claim 14 wherein the inner segments include aluminum.

16. Apparatus for molding an endless tractor track having treads on its outer portion from an uncured rubber belt and a plurality of rough-formed drive lugs, said apparatus comprising:

a molding press having a lower platen provided with a plurality of horizontally movable outer molding segments formed with tread-defining recesses on their inner portions, and a plurality of horizontally movable inner molding segments, each inner molding segment having a drive lug cavity that initially removably holds a drive lug and the molding press also including a mold top;

a drive lug drum formed with a plurality of apertures that removably receive the drive lugs;

a drive lug loader that encircles the drive lug drum and includes power-operated means to urge the drive lugs out of the drive lug drum apertures into the drive lug cavities of the inner segments;

a belt handler for coaxially positioning an uncured belt outwardly of the inner molding segments of the segment loader;

power-operated means on the molding press to urge the inner molding segments outwardly to partially final form and retain the drive lugs against the inner periphery of the uncured belt;

second power-operated means on the molding press to pull the mold top into the lower platen to close the molding press; and heating means on the molding press operable when the molding press is closed to effect curing of the belt between the inner and outer molding segments while forming the treads on the outer surface of the belt and finally forming and bonding the drive lugs onto the inner portion of the belt.

17. Apparatus as set forth in claim 16 wherein the mold top engages the outer segments to compress the uncured belt between the inner and outer segments during operation of the heating means.

18. Apparatus as set forth in claim 16 which further includes means for cooling the inner molding segments before the inner molding segments are retracted to free the cured belt.

19. Apparatus as set forth in claim 16 wherein the belt handler includes a plurality of vertical fingers that are selectively retractable whereby the plurality of fingers removably engage the inner periphery of the belt to effect movement thereof relative to the molding press.

20. Apparatus as set forth in claim 16 wherein the second power-operated means includes fluid-actuated cylinder and plunger units interposed between the lower matrix and the mold top.

21. A method of making an endless tractor track having treads on its outer portion from an initially uncured rubber belt and a plurality of drive lugs, such method including the steps of:

providing outer molding segments having recesses to form treads on the outer portion of the belt;

providing inner molding segments having drive lug cavities on their outer sides;

positioning the uncured belt between the molding segments;

providing a drive lug support that removably receives the drive lugs;

positioning such drive lug support radially outwardly of the inner molding segments;

urging the drive lugs out of the drive lug support into the drive lug cavities of the inner segments;

advancing the inner molding segments against the inner periphery of the uncured belt to secure the drive lugs to the inner periphery of the uncured belt;

heating the outer and inner molding segments to cure the belt while molding treads on the outer portion of the belt and bonding the drive lugs to the inner portion of the belt to form the endless tractor track; and removing the completed tractor track from between the molding segments.

* * * * *